United States Patent Office 2,717,246
Patented Sept. 6, 1955

2,717,246

TITANIUM DIOXIDE PIGMENT COATED WITH A HYDROUS OXIDE AND A POLYSILOXANE

Roy H. Kienle, Bound Brook, John W. Eastes, Somerville, and Theodore F. Cooke, Martinsville, N. J., assignors to American Cyanamid Company, New York, N. Y., a corporation of Maine No Drawing. Application December 10, 1952,
Serial No. 325,231

13 Claims. (Cl. 260—37)

The present invention relates to novel composite titanium dioxide pigments and methods for the preparation thereof. More particularly, the present invention relates to composite titanium dioxide pigments consisting essentially of titanium dioxide pigment particles bearing a thermocured coating which comprises an underlying coating of water-insoluble polyvalent metal hydrous oxide and a superimposed coating of a polyorganosiloxane, and methods for preparing the composite pigments. These pigments are characterized by their great resistance to wetting by water, their resistance to attack by acids, and by the ease with which they may be incorporated into hydrophobic printing-ink vehicles. They are thus particularly useful in the preparation of inks for use in planographic printing, particularly lithography.

The planographic process is the second of the three major divisions of printing and includes all the processes of printing from flat, or slightly etched, surfaces, such as stone lithography, offset lithography, offset tint printing, etc., in which the surfaces have ink-receptive and ink-repellent areas. The principle underlying the various processes is that grease and water are mutually repellent. In the ordinary stone lithographing process, a special slab of acid-sensitive stone is carefully planed and smoothed to prepare it for the subject matter and the surface is made perfectly grease-free. The design may be drawn on the surface of the stone by means of a greasy crayon, or it may be transferred to the stone from a design or printed matter prepared upon a suitable transfer paper using a greasy ink. In the latter case the transfer paper is placed upon the stone and the design transferred by pressure. Thereafter, the surface of the stone is etched very slightly with dilute nitric acid, which acts only upon those portions of the stone which are not protected by the greasy ink. After etching, the stone is coated with a solution of gum arabic, which enters the pores of the stone and prevents further absorption, holding the greasy ink to the lines of the design and preventing it from spreading.

In ordinary lithographic printing, the surface of the printing stone must be dampened as well as inked for each impression, and the presses are equipped with special dampening rollers for this purpose. Frequently, a small amount of chromic or phosphoric acid or an acid salt such as ammonium acid phosphate, together with a little gum arabic, is added to the dampening solution (hereinafter called the "fountain solution") to etch the surface of the stone very slightly but continuously, to keep the lines sharp and to prevent them from being worn away rapidly. When the moistened stone is inked in the usual way, the ink adheres only to the greasy portion and is repelled from the dampened portion of the stone. The design is offset on to paper, as in the usual printing process.

Lithographic printing inks must be concentrated, since in this process it is impractical to deposit on the stone as large a volume of ink as is deposited in typographic printing. This necessitates the grinding of as much pigment as possible into the vehicle which will impart sufficient strength, lift and gripping qualities to the ink without, however, making the ink so viscous or giving it so much tack as to tear the paper or pull off the greasy design. Moreover, lithographic inks must not contain any substance which is soluble in or preferentially dispersible either in the dilute acids or water used to dampen the stone, or which will make the ink emulsify with these liquids. Otherwise the ink will bleed into the uninked portions of the printing surface and to be carried thence on to the printed sheets.

Since titanium dioxide and particularly rutile titanium dioxide has the highest opacity of any commercially available white pigment, it will readily be apparent if this were the sole consideration, titanium dioxide might be expected to be the white pigment of choice for use in lithographing processes. However, ordinary titanium dioxide, that is, titanium dioxide prepared by calcination of a washed titania hydrolysate or by combustion of titanium tetrachloride with oxygen is extremely hydrophilic and therefore valueless for use in lithographic inks.

The discovery has now been made that a composite titanium dioxide pigment can be prepared which is far superior for use in lithographic inks by first coating ordinary titanium dioxide pigment particles with one or more water-insoluble polyvalent metal hydrous oxides including hydroxides, and then coating the particles with a polyorganosiloxane. The polysiloxane coatings are formed by hydrolyzing a diorganodichlorosilane, a monoorganotrichlorsilane, a diorganodihydrogensilane, or a monoorganotrihydrogensilane or mixtures thereof followed if desired by heating the coated pigment to develop more fully the water-repellent properties of the hydrolysis product thus formed. The silanes referred to have the formula $A_2SiXY$, wherein A designates chlorine or hydrogen, X represents A or Y, and Y represents a hydrophobic organic radical having fewer than 22 carbon atoms. The structural formulae of the polymers have not been determined and an immense number of possibilities exist. Hence these polymers are best described by their method of preparation.

It has been found that the composite pigments thus prepared are both extremely water-repellent and hydrophobic in nature, showing little or no tendency to disperse into the aqueous phase when incorporated into a lithographic ink and rapidly agitated with water. On the contrary, the composite titanium dioxide pigment particles of the present invention are selectively retained by the lithographic ink. Moreover, the composite coating is substantially insoluble in the ordinary organic printing ink vehicles and therefore affords permanent protection. Still further, this coating is chemically stable and is not removed or even noticeably attacked by water or by the acidic lithographic fountain solution.

Finally, it has been found that when formulated into printing inks according to conventional practices in the proportions hereinafter set forth, frequently inks of lower apparent viscosities or consistencies result. This means that often a greater weight of pigment can be incorporated in the inks without any increase in their apparent viscosity, thus providing inks containing a heavier loading of titanium dioxide with no increase in viscosity.

The pigments of the present invention also find use in emulsion paints, i. e., aqueous emulsions of film-forming materials. Up to the present time, only flat paints of this type have been marketed, owing to the difficulty of obtaining satisfactory gloss. In order to obtain an emulsion of a pigmented organic film-forming material which will dry to a glossy film, it is necessary that the pigment be present entirely in the oil phase, as any pigment in the water phase is deposited on the surface of the film and produces a flat surface when the water evaporates. Since the pigments of the present invention are extremely water-repellent and very satisfactorily organophilic, it is evident that they permit the formulation of emulsified oil paints which will dry to a glossy film.

It is an outstanding feature of the present invention that the coated particles in the dried cake are only loosely aggregated, and are not cemented or "sintered" together even after the coating has been thermocured. As a result, titanium dioxide of pigmentary grade is obtained merely by disintegrating the cake in a mortar and pestle, cage mill or similar apparatus. The product consists of ultimate particles which are of pigmentary dimensions and which may be incorporated in paints and printing inks without further treatment.

It is a further feature that the pigments of the present invention are free flowing powders which do not cake, agglomerate or otherwise mutually cohere on storage. No doubt this is due to the fact that the silicon coatings are in a cured, insoluble condition and provide the particles with a smooth, non-tacky surface.

The reason why the di- and trichlorosilanes are so effective in conjunction with polyvalent metal hydrous oxides in rendering titanium dioxide pigment suitable for use in lithographic inks is not understood, and applicants do not wish to be limited to any theory.

According to a preferred embodiment of the present invention, ordinary titanium dioxide pigment particles are first coated with between 0.1% and 2.5% of their weight of at least one water-insoluble polyvalent metal hydrous oxide. The pigment is then provided with a polysiloxane coating, as follows.

In one method for applying the polysiloxane, the titanium dioxide is dried and slurried with a dry inert solvent for an organic di- or trichlorosilane, for example, benzene, toluene or xylene, until the particles are completely and uniformly wetted by the solvent. A small amount of the organic silane is then added, sufficient to form a hydrolysis product weighing from 0.005% to about 15% of the weight of the titanium dioxide. This addition causes the temperature of the slurry to rise slightly. The slurry is then moderately heated and stirred until distribution of the silane is substantially complete and is then cooled. Sufficient ammonium hydroxide is added to hydrolyze the silane to the polyoxysiloxane and to adjust the pH of the slurry to at least about neutrality, protecting the aluminum oxide coating and neutralizing the HCl formed when the silane contains chlorine. This addition is accompanied by a very pronounced temperature rise and, in the case of the chlorosilanes, is usually accompanied by the evolution of white fumes. The pigment is recovered by the usual steps of filtration or evaporation, followed if desired by washing and drying to remove the ammonium chloride formed.

In an alternative method, the aluminum hydroxide-coated titanium dioxide is slurried with water and, in a separate step, the silane is polymerized by hydrolysis and emulsified with water by the use of ammonium hydroxide as described. The two suspensions are then mixed, stirred, and dried, with the result that the titanium dioxide particles become coated with the hydrolyzed silane. Thereafter, the pigment is recovered as described.

The water-repellency of the pigments produced in either of the above ways is increased by heating the dried pigments to develop fully the water-repellent properties of the coating. During this heating a certain degree of cross linking and chain build-up takes place through reaction of the residual hydroxyl groups of the polysiloxane.

Monomeric monochloro or monohydrogen triorgano silanes and the hydrolysis polymers thereof are not advantageous in the process of the present invention as these confer little or not water resistance to the pigment. On the other hand, all of the dichloro silanes, dichloro diorganosilanes, and monoorgano silanes tested have yielded titanium dioxide pigment particles of excellent water-repellency and a very satisfactory organophilic property.

In general, the water-repellence of the pigments increases with the length or size of the hydrophobic radicals, but the longer chain length substituents having a chain length in excess of 22 carbon atoms are too unstable for use in modern high speed high temperature printing processes. In silicone polymers, however, the short chain and smaller organic radicals are very hydrophobic, notably the phenyl and alkyl groups of fewer than 4 carbon atoms and yield coatings of excellent water repellency having good resistance to heat. Pigments coated with silicone polymers containing long chain length substituents find use chiefly in low-temperature applications such as in the formulation of house paints and in printing processes where the printing ink dries at ordinary temperatures by evaporation or absorption of the solvent.

Since polysiloxanes having cyclic substituents of the size of phenyl or having open chain substituents up to octyl are very water resistant and sufficiently heat stable for use as coatings for lithographic pigments, the preferred substituents are selected from the group of phenyl, methyl, saturated and unsaturated hydrocarbon chains having between 1 and 8 carbon atoms, and the alkaryl and aralkyl substituents derived from these carbon chains. Pigments coated with polysiloxanes containing these groups have excellent water resistance and are sufficiently heat resistant to be thermocured as described above.

The first coating may be provided by any water-insoluble polyvalent metal hydrous oxide, included among which are the water-insoluble polyvalent metal hydroxides. The great majority of such hydrous oxides and oxides are colored, and in the past titanium dioxide has been coated with many members of this group to provide colored or tinted titanium dioxide particles. At the present time, however, titanium dioxide is chiefly valued for its brilliant whiteness and therefore it is almost universal practice to apply thereto only white or colorless hydrous oxides, notably aluminum hydroxide, zinc hydroxide, the hydrous oxides of silicon, and the hydrous oxides of titanium. Because of its whiteness, cheapness, and pronounced effect in improving the chalk resistance of paints, present practice prefers aluminum hydroxide, as the principal coating material, and this is applied in amount from 0.1% and up to 2.5% of the weight of the pigment, typically about 1%–1.5%. Minor amounts, for example, from 0.1% to 1.5% each of zinc hydroxide, the hydrated oxides of silicon and the hydrated oxides of titanium are frequently also applied, and typically these oxides will each be present in the amount of $\frac{1}{4}\%$–$\frac{1}{3}\%$ based on the weight of the titanium dioxide. Generally the total amount of the deposited hydrous oxides will not be more than $1\frac{1}{2}\%$–3% of the weight of the titanium dioxide as larger amounts, it has been found, adversely affect the pigmentary qualities and opacity of the titanium dioxide without conferring any compensating benefit.

It will be understood that these hydrous oxides are applied with a titanium dioxide in aqueous suspension and that during the drying step which follows, the hydrous oxides may be converted to a partially dehydrated form. Any of these hydrous oxides including hydroxides may be used and the step of preparing pigments coated therewith, standing alone, plays no part in the present invention.

The temperature at which the pigment is provided with its polysiloxane coating may vary from room temperature or lower to that of the boiling point of the solvent or water, and is therefore not critical. Similarly, the pigment may be dried at any convenient temperature. A drying temperature of about 90° C. is suitable; but it is an important feature of the present invention that when the dried pigment is heated to between about 125° C. and 300° C. for about 2 hours at the lower temperature or about 5 minutes at the upper temperature, a pronounced increase in the water repellency of the pigment is effected. Higher temperature for a shorter time may be employed to effect this cure. Preferably the coating is cured at about 175° C. for 15 minutes, as under these conditions good water-repellency is imparted at a moderate temperature in a convenient length of time in conventional equipment.

A peculiarity of the invention resides in the fact that superior results are obtained when the silane is hydrolyzed by ammonium hydroxide. In the first method, where the pigment and the silane are first slurried under anhydrous conditions and the silane is hydrolyzed in situ, far superior results are obtained when ammonium hydroxide is used for this purpose. When sodium hydroxide is used, the water resistance of the final pigment is much reduced and in a number of instances the pigment has displayed no water resistance at all. In the second method where the silane is hydrolyzed separately, the decrease in water-repellence is much less, but even here the use of ammonium hydroxide is preferable.

The amount of polysiloxane which may advantageously be present on the pigment varies within wide limits. As little as about 0.005% of the polysiloxane causes the pigment to become noticeably water-repellent, and there therefore does not appear to be any lower limit to the amount which may be deposited without at least some benefit. When about 1% is present, it is found that paints containing a pigment so prepared exhibit a reduced viscosity as compared with paints prepared from the same pigment which is free from the polysiloxane. This reduction in viscosity reaches a maximum when the weight of the polysiloxane is about 5% of the weight of the pigment, and when the weight of the polysiloxane exceeds about 15% of the weight of the pigment the viscosity of the paint or ink increases to the limit permitted by commercial standards. As a result, it is preferred to maintain the weight of the coating of polysiloxane between about 0.1% and 3% of the weight of the titanium dioxide, this amount of coating providing a pigment which is satisfactorily water-repellent and organophilic and which when incorporated in paints or inks permits a heavier pigment loading at the same viscosity.

The invention has been fully described and disclosed above. It will be more fully described with reference to the following examples, which will illustrate, but do not limit, the invention as disclosed. Parts are by weight unless otherwise noted.

EXAMPLE 1

800 g. of hydroclassified titanium dioxide pigment produced by the calcination of titanium sulfate hydrolysate was slurried with 4.5 liters of water and 4 g. of $ZnSO_4.H_2O$ stirred in. Sodium silicate equivalent to 0.25% of the weight of the titanium dioxide was then added, followed by 40 parts of aluminum sulfate octadecylhydrate. During these additions the temperature of the slurry was about 50° C. After 30 minutes of stirring the pH was raised to 7.8 by the addition of aqueous NaOH. The slurry was dewatered, washed until free of soluble salts and dried at about 110° C. The pigment thus prepared contained about 1% of aluminum hydroxide, calculated as $Al_2O_3$, and about 0.25% each of zinc hydroxide and silicic acid, respectively calculated as ZnO and $SiO_2$. This pigment was designated as pigment 1-A.

50 grams of pigment 1-A was slurried with 150 ml. of dry toluene and 5 grams of dimethyldichlorosilane were added as a 10% solution in toluene. The addition caused the temperature to rise by about 1° C. The slurry was then agitated at 60° C.–68° C. for 2 hours by means of a paddle revolving at 60 R. P. M. The slurry was cooled to 24° C. and a 100 ml. of 14% ammonium hydroxide were added. The slurry fumed considerably and its temperature rose to 37° C. It was again cooled to 24° C., agitated for ½ hour and filtered. The filter cake was shaken with 1 liter of water, filtered, and dried up to 90° C. at 10 mm. pressure. The cake was heated at 150° C. for 30 minutes and disintegrated in a mortar and pestle. Only gentle pulverization was required. The product (pigment 1–B) was a powder of pigmentary grade and no particular sintering appeared to have occurred during the entire treatment. The pigment was tested for its hydrophobic properties by pasting 4 grams of the pigment with 4 ml. of water in comparison with a sample of pigment 1–A. Pigment 1–A wet practically instantaneously, where as 324 seconds were required before pigment 1–B became wet.

Pigment 1–B was extracted with benzene for 4 hours in a Soxhlet extractor. A brown wax was recovered and the pigment was dried and tested again. It was found that this extraction caused the hydrophobic properties of the pigment to increase slightly, 354 seconds now being required before the pigment became wet.

The procedure described above was repeated using an equivalent amount of sodium hydroxide. The pigment obtained (pigment 1–B) was very hydrophilic, wetting almost instantly when pasted with water.

The procedure described above was repeated using trimethyl chlorosilane. The product (pigment 1–C) was very hydrophilic, demonstrating that the silane must contain at least two chlorine atoms.

The process described above was repeated using, however, ordinary titanium dioxide, that is, titanium dioxide which had been subjected to no preliminary coating treatment and which was the pigment obtained by calcining a washed titanium sulfate hydrolysate to yield rutile, hydroclassing the calciner discharge, and jet-milling the product. In one repetition methyl trichloro silane was used and in the second repetition trimethyl monochloro silane. In each instance, the dry pigments (pigments 1–D and 1–E respectively) when pasted with water, became wet in 13 seconds or less, demonstrating the necessity for the aluminum hydroxide coating.

EXAMPLE 2

Samples of pigment 1–A were coated with polysiloxanes using the various silanes shown in the table below by the method of Example 1, except that the stirring temperatures and times and the drying temperature were varied as shown in the table. The coated pigments were tested for their water-repellence by the method of Example 1 and for their organophilic properties by substituting KVO linseed oil for the water employed in that test.

A lithographic fountain solution was prepared by dissolving 20 parts of 85% phosphoric acid and 10 parts of gum arabic in 1000 parts of distilled water. The resistance of the pigments to this fountain solution ("bleed resistance") was determined by continuously blending 20 g. of the pigment with 50 ml. of the fountain solution in a laboratory ink tester having revolving and intermeshing paddles for 15 minutes and observing the aqueous phase. Except for the control example, which bled badly, only a slight milkiness was observed indicating that the polysiloxane coated pigments were satisfactory. The pigments were dried and then pasted with water in accordance with Example 1. The pigments proved to be still very water-repellent. The control pigment, however, showed no resistance to the fountain solution.

Table A

| Pigment | Silane Added [1] | | Stirring | | Drying Temp. | Wetting (Secs.) | |
|---|---|---|---|---|---|---|---|
| | Name | Percent | Temp., °C. | Time, Hrs. | | H₂O | Oil |
| 1-A | None (Control) | | | | | 0 | 70 |
| 2-A | Dimethyldichloro (A) | 10 | 68 | 2 | 90 | 324 | |
| 2-B | ...do... | 4 | 65 | 2 | 95 | 540 | 58 |
| 2-C | ...do... | 3 | 65 | 2 | 95 | 603 | 50 |
| 2-D | ...do... | 2 | 65 | 2 | 95 | 150 | 70 |
| 2-E | Dimethyldichloro (B) | 3 | 65 | 2 | 90 | 498 | 55 |
| 2-F | ...do... | 3 | 60 | 2 | ² 50 | 265 | |
| 2-G | Dimethyldichloro (C) | 3 | 62 | 2 | 90 | 557 | 60 |
| 2-H | Diethyldichloro | 3 | 60 | 2 | 95 | 85 | 32 |
| 2-I | Ethyltrichloro | 3 | 60 | 2 | 95 | >900 | 58 |
| 2-J | ...do... | 3 | 60 | 2 | ² 50 | >1,000 | |
| 2-K | Diphenyldichloro | 3 | 60 | 2 | 95 | 84 | 42 |
| 2-L | Phenyltrichloro | 3 | 61 | 2 | 95 | 310 | 27 |
| 2-M | Dialyldichloro | 3 | 60 | 2 | 90 | 566 | 32 |
| 2-N | Allyltrichloro | 3 | 60 | 2 | 90 | 106 | 27 |

[1] Three different samples of crude dimethyl dichlorosilane were used, marked A, B, and C in the table. Each contained more than 50% dimethyl dichlorosilane, the balance in each instance consisting predominantly of other methylchlorosilanes.
² Dried for 15 hours.

EXAMPLE 3

To 400 parts of water were added 32 parts of a 50% solution of dimethyldichlorosilane in benzene. An aqueous emulsion of the polyorganosiloxane formed at once.

400 parts of pigment 1-A of Example 1 were slurried in 1200 parts of water and rapidly agitated for 30 minutes. The polyorganosiloxane emulsion was then added and the slurry slowly stirred for 1 hour. The pigment was recovered by filtration, and after washing was dried for about 15 hours at 55° C. at about 20 mm. of Hg pressure. The dry product (pigment 3-A) was titanium dioxide of pigmentary grade and was free from aggregates, lumps or other objectionable oversize particles.

Pigment 3-A had a water repellence value of 520 seconds when tested by the method of Example 1.

A part of pigment 3-A was heated for 3 hours at 150° C. and tested for its water repellence in the same manner, yielding pigment 3-B. The wetting time of this pigment was in excess of 30 minutes.

EXAMPLE 4

A printing ink was prepared by milling 61 parts of pigment 3-A of Example 3 into 37 parts of litho No. 0 varnish and 0.18 part of cobalt linoleate dryer containing 3% metal as Co. The bleed resistance of the pigment was determined by continuously mixing 50 parts of this ink with 150 parts of the fountain solution of Example 2 at room temperature for 15 minutes in a tester of the intermeshing paddle type allowing the mixture to stand for 5 minutes, and noting the appearance of the aqueous phase. More than slight milkiness is evidence of unsatisfactory performance. Additional inks were prepared and tested in the same way using pigment 3-B of Example 3 and pigment 1-A of Example 1 as control. Results are as follows.

| Pigment | Silicone Coating | Heat Cured | Results of Bleed Test |
|---|---|---|---|
| 1-A | No | | Solution very milky in 5 minutes. |
| 3-A | Yes | No | Trace milkiness in 15 minutes. |
| 3-B | Yes | Yes | No milkiness in 15 minutes. |

The test demonstrates that both pigments 3-A and 3-B yield inks which are very satisfactory for lithographic use.

EXAMPLE 5

The mixing and consistency characteristics of the polysiloxane pigment 3-B of Example 3 was determined in comparison with a sample of the parent pigment 1-A of Example 1 which contained no polysiloxanes as follows: 250 parts of pigment were added to 100 parts of heat-bodied linseed oil (Archer Daniells Midland Co., No. 371, iodine value 155–165, acid number 4–6, saponification No. 189–195) in a standard laboratory change can mixer. The motor was started immediately upon the addition of the pigment to the oil, and the time required in each instance for the pigment and oil to form a firm ball was noted with a stopwatch. The mixing was continued and the time required for the ball to start to "break" or form a mobile system was similarly noted. The mixing was further continued for 5 additional minutes. Linseed oil was then added to the two pastes to reduce their pigmentation to 61%, mixing was continued for 3 minutes, and the resulting pastes were given two passes at a tight setting through a laboratory three-roll mill.

Viscosity of the paints was determined at a temperature of 77° F. in a Stormer viscosimeter and the viscosity in Krebs units calculated therefrom by the method described on page 306 of "Physical and Chemical Examination of Paints, Varnishes, and Colors" by Gardner and Schward, 11th ed. (1950).

The texture of the pigments was determined by mulling the pigment at 25 parts by volume with an alkyd resin varnish (Glyptal resin 2475), preparing pull-downs of wedge-shaped cross-sections from 0.002" to zero in thickness, drying the films, and evaluating the films on an arbitrary scale in which 10 is perfect and 2 is the minimum texture commercially acceptable for paint pigments. A rating of 6 or better on this scale is excellent.

| Remarks | Silicone Treated Pigment (Pigment 3-B) | Untreated Pigment (Pigment 1-A) |
|---|---|---|
| Mixing time | 2 hr. 35 min | 2 hr. 15 min. |
| Final consistency | 77 K. U | 75 K. U. |
| Texture of films | 7.5 | 6.5. |

The above results indicate that the silicone coating did not significantly affect the mixing characteristics of the pigment while causing a marked improvement in the texture of the film.

EXAMPLE 6

The pigments employed in Example 5 were made into white and blue tinted alkyd resin enamels at 25 parts/volume concentration. The panels were applied to primed steel panels, which were dried at room temperature, and exposed in a laboratory weathering unit. The panels were observed once every day and were removed when the chalking was found to be "considerable." The hours of exposure required to produce this degree of chalking in the panels was as follows:

| Pigment | Blue Tinted | White Tinted |
|---|---|---|
| | Hours | Hours |
| Untreated (pigment 1-A) | 449 | 690 |
| Silicone-treated (pigment 3-B) | 493 | 765 |

The color retention of the treated samples was slightly better than that of the untreated samples. From the results, it is evident that the polysiloxane coating caused an appreciable improvement in chalk resistance.

EXAMPLE 7

Samples of pigments 2-F and 2-J of Example 2, respectively prepared by the use of dimethyldichlorosilane and ethyltrichlorosilane, and a sample of pigment 1-A of Example 1 were made into standard baking enamels by the use of Glyptal resin 2475 (an air-drying alkyd resin vehicle) at 25 parts of pigment by volume, the viscosity of the enamels determined in Krebs units as described in Example 5, and the enamels applied to primed steel panels. The panels were baked dry and subjected to simultaneous testing in a laboratory weathering unit. Failure of the panels was taken as occurring when the chalking was rated as "considerable."

| Pigment | | Enamel Consistency, K. U. | Hours to Fail |
|---|---|---|---|
| No. | Silane Used | | |
| 1-A | None | 70 | 376 |
| 2-F | Dimethyldichloro | 51 | 502 |
| 2-J | Ethyltrichloro | 54 | 404 |

The results demonstrate that application of the silicone coating resulted in formation of a pigment of markedly improved mixing characteristics and that paints containing these pigments exhibit improved chalk resistance.

EXAMPLE 8

A sample of pigment 1-A of Example 1 was divided into five portions, one portion being reserved as control. Polysiloxane coated pigments were prepared from this pigment by the following procedures.

*Pigment 8-A.*—200 g. of titanium dioxide was agitated in 500 ml. of water for one-half hour. 100 ml. of sodium carbonate solution containing 24.2 g. $Na_2CO_3$ per liter was added followed by 30.0 ml. of a toluene solution containing 100 gm. of technical dimethyl dichlorosilane per liter of solution. This was followed by 100 ml. more sodium carbonate solution and 30 ml. more of the solution of dimethyldichlorosilane. This mixture was agitated for one hour at pH 6.7 and then heated to 85° C. for one hour. The hot mixture was filtered, washed with water, and dried at 65° C. over night.

*Pigment 8-B.*—400 g. of titanium dioxide was agitated for one-half hour in 1200 g. of water and then there was added a dispersion consisting of 400 ml. water and 16 g. of a 50% emulsion of silicone oil in water prepared by hydrolyzing and polymerizing dimethyldichloro-silane. The slurry was agitated for one hour, after which the pigment was filtered off and dried at room temperature for two days. Thereafter the pigment was heated at 150° C. for three hours.

*Pigment 8-C.*—A dispersion of monomethyl hydrogen siloxane was prepared by mixing 1.0 part of the siloxane with 0.1 part of dioctylsulfosuccinate and 98.9 parts of water.

400 ml. of the dispersion was added to a suspension of 400 g. of $TiO_2$ in 1200 ml. of water. This was agitated for one hour and filtered, washed, dried for 15 hours at 65° C. and then heated at 150° C. for 3 hours.

*Pigment 8-D.*—A 75% silicone oil emulsion prepared by hydrolyzing and polmerizing dimethyldichloro silane was diluted with 400 ml. of water and added to a suspension of 400 g. of titanium dioxide in 200 ml. of water. The mixture was filtered and treated as above.

The water resistance of the pigments was determined by the method of Example 1.

Portions of all the pigments including the control, were formulated into lithographic inks using K-91 lithographic vehicle (#0 transparent litho oil) at 71.5% pigmentation. The inks were stirred in fountain solution containing 1% of gum arabic and 2% of 85% phosphoric acid in the proportion of 20 grams of ink per 50 ml. of solution. The time was noted at which the first milkiness or "bleed" appeared in each respective solution, as well as the appearance of the solutions 30 minutes after occurrence of the first bleed. Results are as follows:

| Pigment | | $H_2O$ Repellence [1] | | Minutes To 1st Bleed | Final Fountain Solution [2] |
|---|---|---|---|---|---|
| Test No. | Silane Used | Initial | After Cure | | |
| 1-A [3] | None | 0 | | 3.25 | Cons. milky. |
| 8-A | Dimethyldichloro | 134 | 182 | 16.0 | Sl. milky. |
| 8-B | do | | 720 | 30.0 | |
| 8-C | Monomethyltrihydrogen | | 730 | >30.0 | |
| 8-D | Dimethyldichloro | | 480 | 18.0 | V. v. s. milky. |

[1] Seconds.
[2] Appearance of fountain solution 30 minutes after occurrence of first bleeding.
[3] Control pigment (uncoated).

These tests demonstrate that the treated pigments after cure exhibited from very good to excellent water repellence, and that the untreatel pigment failed completely. The bleed tests show that the control pigment, when formulated into an ink, resists fountain solution for only about three minutes, whereas the inks containing the silicone-coated pigments were fully satisfactory. When the test was discontinued, all the samples had decreased slightly in body but maintained good workability.

We claim:

1. Titanium dioxide pigment particles coated first with between about 0.1% and 2.5% their weight of a water-insoluble polyvalent metal hydrous oxide and then with between about 0.005% and 15% of their weight of a thermocured polyorganosiloxane, said polyorganosiloxane being the hydrolysis product of at least one silane of the formula $A_2SiXY$, wherein A is a substituent selected from the group consisting of Cl and H, X is selected from the group consisting of A and Y, and Y is a hydrocarbon radical having fewer than 22 carbon atoms.

2. Titanium dioxide pigment particles coated first with between 0.1% and 2.5% of their weight of at least two white, water-insoluble polyvalent metal hydrous oxides, said hydrous oxides including an aluminum hydroxide, and then with between about 0.005% and 3% of their weight of a thermocured polysiloxane, said polysiloxane being the hydrolysis product of at least one silane of the formula $A_2SiXY$, wherein A is a substituent selected from the group consisting of Cl and H, X is selected from the group consisting of A and Y, and Y is a hydrocarbon radical having not more than 8 carbon atoms.

3. Titanium dioxide pigment particles coated first with about 1%–15% of their weight of an aluminum hydroxide and then with between about 0.1% and 3% of their weight of a thermocured polysiloxane, said polysiloxane being the hydrolysis product of a silane of the formula $A_2SiXY$, wherein A is a substituent selected from the group consisting of Cl and H, X is selected from the group consisting of A and Y, and Y is a hydrocarbon radical having not more than 8 carbon atoms.

4. Titanium dioxide pigment particles coated with about 1%–1.5% of their weight of an aluminum hydroxide, about ⅓% of their weight of zinc hydroxide and about ⅓% of their weight of hydrous silicon oxides, and then with about 0.1% to 3% of their weight of a thermocured polysiloxane, said polysiloxane being the hydrolysis product of a silane of the formula $A_2SiXY$, wherein A is a substituent selected from the group consisting of Cl and H; X is selected from the group consisting of A and Y, and Y is a hydrocarbon radical having not more than 8 carbon atoms.

5. A process for improving the water-repellency of titanium dioxide pigment particles which comprises first coating said particles with between 0.1% and 2.5% of their weight of at least one water-insoluble polyvalent metal hydrous oxide, then coating said particles with between 0.005% and 15% of their weight of a polyorganosiloxane, and heating said particles at between 125° C. and 300° C. to cure said polysiloxane and develop the water-repellent properties thereof; said polyorganosiloxane being the hydrolysis product of at least one silane of the formula $A_2SiXY$, wherein A is a substituent selected from the group consisting of Cl and H, X is selected from the group consisting of A and Y, and Y is a hydrocarbon radical having fewer than 22 carbon atoms.

6. A process for improving the water-repellency of titanium dioxide pigment particles which comprises first coating said particle with between 0.1% and 2.5% of their weight of at least two white, water-insoluble polyvalent metal hydrous oxides, said hydrous oxides including an aluminum hydroxide, then coating said particles with between 0.1% and 3% of their weight of a polyorganosiloxane, and heating said particles at between 125° C. and 300° C. to cure said polyorganosiloxane and develop the water-repellent properties thereof; said polyorganosiloxane being the hydrolysis product of at least one silane of the formula $A_2SiXY$, wherein A is a substituent selected from the group consisting of Cl and H, X is selected from the group consisting of A and Y, and Y is a hydrocarbon radical having fewer than 22 carbon atoms.

7. A process for improving the water repellency of titanium dioxide pigment particles having a coating of at least one white water-insoluble polyvalent metal hydrous oxide including an aluminum hydroxide, the weight of said coating being between about 0.1% and 2.5% of the weight of the titanium dioxide, which comprises coating said particles with between 0.1% and 3% of their weight of a polyorganosiloxane and heating said said particles at between 125° C. and 300° C. to cure said polysiloxane and develop the water-repellent properties thereof; said polysiloxane being the hydrolysis product of at least one silane of the formula $A_2SiXY$, wherein A is a substituent selected from the group consisting of Cl and H, X is selected from the group consisting of A and Y, and Y is a hydrocarbon radical having fewer than 8 carbon atoms.

8. A process for improving the water repellency of titanium dioxide pigment particles having a coating of an aluminum hydroxide thereon, the weight of said coating being between 0.1% and 3% of the weight of the titanium dioxide, which comprises slurrying said particles in an anhydrous inert solvent for silanes, mixing with said slurry a predetermined amount of a silane of the formula $A_2SiXY$, wherein A is a substituent selected from the group consisting of Cl and H, X is selected from the group consisting of A and Y, and Y is a hydrocarbon radical having not more than 8 carbon atoms, the weight of said added silane calculated as the hydrolysis product thereof being between 0.005% and 15% of the weight of said titanium dioxide; hydrolyzing said silane to a polysiloxane and adjusting the pH of the slurry to about 7; and heating the pigment to between 125° C. and 300° C. to dry the same and develop the water-repellent properties of the polysiloxane.

9. A process for improving the water repellency of titanium dioxide pigment particles having a coating of an aluminum hydroxide thereon, the weight of said coating being between about 0.1% and 2.5% of the weight of said titanium dioxide, which comprises slurrying said particles in an anhydrous organic solvent for silanes, mixing with said slurry a predetermined amount of a silane of the formula $A_2SiXY$, wherein $A_2$ is selected from the group consisting of Cl and H, X is selected from the group consisting of A and Y, and Y is a hydrocarbon radical containing fewer than 8 carbon atoms, the said added silane calculated as the hydrolysis product thereof being between 0.1% and 3% of a polysiloxane upon hydrolysis thereof, adding aqueous ammonium hydroxide to hydrolyze said silane and to adjust the pH of the slurry to about neutrality, drying said slurry, and heating the residue to between about 125° C. and 300° C. to dry the same and develop the water-repellent properties of the polysiloxane.

10. A process for improving the water-repellency of titanium dioxide pigment particles having a coating of an aluminum hydroxide thereon, the weight of said coating being between about 0.1% and 2.5% of the weight of said titanium dioxide, which includes the steps of slurrying said particles with a neutral aqueous emulsion of a polyorganosiloxane formed by hydrolyzing a silane of the formula $A_2SiXY$, wherein $A_2$ is a substituent selected from the group consisting of Cl and H, X is selected from the group consisting of A and Y, and Y is a hydrocarbon radical containing fewer than 22 carbon atoms, the weight of said polysiloxane being between 0.005% and 15% of the weight of the titanium dioxide, drying the slurry, and heating the residue to between about 125° C. and 300° C. to develop the water-repellent properties of the polysiloxane.

11. A process according to claim 9, wherein the hydrocarbon radical contains not more than 8 carbon atoms and the weight of the polysiloxane is between 0.1% and 3% of the weight of the pigment.

12. A process for improving the water repellency of titanium dioxide pigment particles having a coating of an aluminum hydroxide, zinc hydroxide, and a hydrous silicic oxide, the total weight of said coating being 1½%–3% of the weight of said titanium dioxide, which comprises coating said particles with between 0.1% and 3% of their weight of a polysiloxane, and heating said particles at between 125° C. and 300° C. to cure said polysiloxane and develop the water-repellent properties thereof; said polysiloxane being the hydrolysis product of at least one silane of the formula $A_2SiXY$, wherein $A_2$ is a substituent selected from the group consisting of Cl and H, X is selected from the group consisting of A and Y, and Y is a hydrocarbon radical containing fewer than 8 carbon atoms.

13. In the manufacture of coated titanium dioxide pigment, wherein a titanium dioxide pigment having a coating of an aluminum hydroxide is coated with a polyorganosiloxane, said polyorganosiloxane being a hydrolysis product of a silane of the formula $A_2SiXY$, wherein A is selected from the group consisting of Cl and H, X is selected from the group consisting of A and Y, and Y is a hydrocarbon radical having fewer than 8 carbon atoms, the step of drying the thus-coated pigment and heating the same between 125° C. and 300° C. to develop the water-repellent properties of the polyorganosiloxane coating.

References Cited in the file of this patent

UNITED STATES PATENTS

| | | |
|---|---|---|
| 2,387,534 | Seidel | Oct. 23, 1945 |
| 2,440,953 | Illiff et al. | May 4, 1948 |
| 2,441,225 | Pechukas | May 11, 1948 |
| 2,467,853 | Poskitt et al. | Apr. 19, 1949 |
| 2,563,555 | Safford | Aug. 7, 1951 |
| 2,610,167 | Grotenhuis | Sept. 9, 1952 |